United States Patent
Bahls (10) Patent No.: US 10,767,268 B2
(45) Date of Patent: Sep. 8, 2020

(54) ARTICLES HAVING IMPROVED CORROSION RESISTANCE

(75) Inventor: Harry J. Bahls, North Haven, CT (US)

(73) Assignee: SWIMC LLC, Cleveland, OH (US)

( * ) Notice: Subject to any disclaimer, the term of this patent is extended or adjusted under 35 U.S.C. 154(b) by 1415 days.

(21) Appl. No.: 11/919,785

(22) PCT Filed: Mar. 29, 2006

(86) PCT No.: PCT/US2006/011520
§ 371 (c)(1),
(2), (4) Date: Feb. 11, 2009

(87) PCT Pub. No.: WO2006/121516
PCT Pub. Date: Nov. 16, 2006

(65) Prior Publication Data
US 2009/0220689 A1    Sep. 3, 2009

Related U.S. Application Data

(60) Provisional application No. 60/678,288, filed on May 6, 2005.

(51) Int. Cl.
| | |
|---|---|
| C23F 11/173 | (2006.01) |
| C23C 22/68 | (2006.01) |
| C23F 11/14 | (2006.01) |
| C23C 22/83 | (2006.01) |
| C23C 22/05 | (2006.01) |
| C23C 22/78 | (2006.01) |
| C09D 5/08 | (2006.01) |
| C03C 17/38 | (2006.01) |
| C03C 17/36 | (2006.01) |

(52) U.S. Cl.
CPC ........ *C23F 11/173* (2013.01); *C03C 17/3663* (2013.01); *C03C 17/38* (2013.01); *C09D 5/086* (2013.01); *C23C 22/05* (2013.01); *C23C 22/68* (2013.01); *C23C 22/78* (2013.01); *C23C 22/83* (2013.01); *C23F 11/149* (2013.01)

(58) Field of Classification Search
CPC .................................................. C23F 11/173
USPC ......................................................... 427/214
See application file for complete search history.

(56) References Cited

U.S. PATENT DOCUMENTS

| | | | | |
|---|---|---|---|---|
| 3,382,087 A | * | 5/1968 | Ostrowski | ..................... 428/626 |
| 4,234,304 A | | 11/1980 | Heytmeijer | |
| 4,255,214 A | * | 3/1981 | Workens | ........................ 148/269 |
| 4,683,071 A | | 7/1987 | Regenass et al. | |
| 5,006,418 A | * | 4/1991 | Servais | ................... C03C 17/10 |
| | | | | 428/621 |
| 5,874,026 A | * | 2/1999 | Pilsits et al. | .................. 252/394 |
| 5,919,572 A | * | 7/1999 | Blum et al. | .................... 428/446 |
| 6,194,368 B1 | * | 2/2001 | Waschenbach | ....... C11D 3/0073 |
| | | | | 510/224 |
| 7,854,253 B2 | | 12/2010 | Woyciesjes et al. | |
| 2001/0003474 A1 | * | 6/2001 | Janssen et al. | ............... 349/122 |
| 2001/0032568 A1 | * | 10/2001 | Schutt | ...................... C09D 4/00 |
| | | | | 106/287.11 |
| 2003/0083453 A1 | | 5/2003 | Lukacs, III et al. | |
| 2005/0211957 A1 | * | 9/2005 | Ward et al. | .................... 252/387 |

FOREIGN PATENT DOCUMENTS

| | | |
|---|---|---|
| GB | 2 102 453 A | 2/1983 |
| JP | S56-62973 | 5/1981 |
| JP | H4-160173 | 6/1992 |
| JP | H5-230675 | 9/1993 |
| WO | WO 99/37626 | 7/1999 |

OTHER PUBLICATIONS

University of Texas at Dallas, Introduction to Organic Nomenclature, Website Accessed: Apr. 14, 2015, p. 1-11.*
Notification of Transmittal of the International Search Report and the Written Opinion of the International Searching Authority, or the Declaration for corresponding patent application No. PCT/US2006/011520, dated Sep. 5, 2006, 17 pages.
Reply to Written Opinion for corresponding patent application No. PCT/US2006/011520, filed Mar. 6, 2007, 14 pages.
Notification of Transmittal of the International Preliminary Report on Patentability for corresponding patent application No. PCT/US2006/011520, dated Aug. 10, 2008, 14 pages.

* cited by examiner

*Primary Examiner* — Tabatha L Penny (57) ABSTRACT

The present application relates to a method for enhancing metal corrosion resistance of a metal deposited on a substrate, the method comprises contacting the metal coated substrate with a treating composition comprising a film forming organic component which treating composition forms a hydrophobic film on the metal coated substrate with a thickness of less than 1 µm. Furthermore, the present application relates to a method for making a mirror comprising a substrate having a metal coated thereon, the method comprises contacting the metal coated substrate with a treating composition comprising a film forming organic component which treating composition forms a hydrophobic film on the metal coated substrate with a thickness of less than 1 µm. Preferably, the film forming organic component is selected from the group consisting of an aromatic triazole compound and a silicone resin. In addition the present application relates to the products obtainable by these methods.

8 Claims, 4 Drawing Sheets

ARTICLES HAVING IMPROVED CORROSION RESISTANCE

This application claims the benefit of the filing date of U.S. Provisional Application No. 60/678,288, filed May 6, 2005.

TECHNICAL FIELD

This invention relates to articles comprising a metal coating, preferably a reflective metal coating, deposited on a substrate, such as a vitreous substrate or a plastic substrate and to methods of manufacturing such articles. Especially, this invention relates to a method of enhancing the corrosion resistance of the metal coating, preferably a reflective metal coating, deposited on the substrate and to the articles produced by that method.

BACKGROUND

For convenience, the following description will be mainly directed to mirrors and improving the corrosion resistance of the reflective layer used to make the mirror but it will be understood by those skilled in the art that other articles (e.g., metal containing substrates and metal particles) may be treated using the method of the invention to enhance the properties of the articles, e.g., the corrosion resistance of the metal.

Conventional mirrors can be made by a process in which a thin layer of a reflective metallic film is applied onto a substrate, typically glass or plastic. Mirrors are generally made continuously by a sequence of steps on a mirror conveyor. The first step lightly polishes and cleans the glass surface and after rinsing, the next step sensitizes the surface e.g. with an aqueous stannous chloride solution. The metal deposited on the substrate is typically silver, although other metals or metal compositions may be used. The silver film layer is deposited on the sensitized glass surface by one of many methods such as described in U.S. Pat. No. 4,737,188 to Bahls. In one typical process, an ammoniacal silver nitrate solution and a reducing agent solution containing a strong base are sprayed on and combined at the sensitized glass surface to deposit the silver film.

If air, water, contaminants, chemicals such as ammonia and other glass cleaners, or other compounds, come in contact with the reflective metallic film, the film may corrode, oxidize, or lose contact with the glass. To protect the film and reduce damage to the metallic layer, a protective overlay of copper may be applied over the metallic film, and/or a protective paint may be applied. This copper film may be applied to and over the silver film by any of a variety of prior art procedures such as a galvanic process which utilizes an aqueous suspension of iron powder and an aqueous solution of copper sulfate or by the disproportionation of cuprous ions on the silver surface. The latter process is described in U.S. Pat. No. 5,419,926 to Soltys. The copper layer is normally painted to produce the finished mirror, or another protective coating such as a hardened organic resin incorporating a corrosion inhibitor may likewise be applied as shown in U.S. Pat. No. 5,156,917 to Sanford. A standard mirror making process thus comprises a series of steps which steps are performed in sequence on a conveyor as part of a continuous mirror making process.

Historically, a serious problem of the mirror manufacturing industry was the need for the copper layer on the silver layer to inhibit corrosion of the silver and increase adhesion of the paint. The application of copper to the silver surface necessarily produces copper containing waste streams which must be environmentally treated or processed for recycling. Typically, the copper streams are treated to remove copper before discharge to the effluent and this procedure is complex and costly. The copper film on the mirror is also a weak link in the life of a conventional mirror. The copper film is easily corroded when the mirror is subjected to ammonia or alkaline glass cleaners because these cause the edges of mirrors to corrode and turn black in color thereby shortening the life of the mirror.

In the seventies researchers found a method of improving the adhesion of metallic silver or copper films on surfaces like glass (e.g. A. Ya. Kuznetsov, et al. in Sov. J. Opt. Technol. 42, 1975, 604). By "activating" a glass surface sensitized with tin dichloride with a $PdCl_2$ solution a markedly improved adhesion has been recognized. Furthermore, it has been realized that corrosion protection may also be enhanced by improving adhesion between the layer of the reflective metal and the substrate. This finding helped to overcome the above mentioned problem of the mirror manufacturing industry. Due to the improved adhesion of the metallic silver film on the substrate the need for protective coatings (e.g. the copper layer mentioned above) overlying the metallic layer has been eliminated. The mirror manufacturing industry now used Pd-based activation (supersensitizing) to produce so called "copper-free mirrors".

A number of patents have been issued for improving treatment of the silver surface in the mirror making process to further increase corrosion resistance. In U.S. Pat. No. 5,374,451 to Servais et al., a mirror is shown having a reflective layer of silver which has been treated with a solution containing ions of at least one of the group consisting of: Cr (II); V (II or III); Ti (III or II); Fe (II); In (I or II); Cu (I); and Al (III). The solution may alternatively contain Sn (II) ions.

In U.S. Pat. No. 5,235,776 to Servais et al., a reflective article is described including a glass substrate and a reflective metal coating, preferably silver, deposited on the glass substrate. This reflective layer of silver has been treated with an acidified aqueous solution of a stannous salt. This solution has to be free from opalescence and, therefore, needs to be freshly-made. By this treatment a population of tin atoms is augmented in a surface stratum of the silver layer. As a preferred embodiment a silane treatment has been applied to the metal coating before a final outside coating e.g. a paint layer is applied.

Alternatively, it has been proposed to protect the silver coating by treatment with an acidified aqueous solution of Sn (II) salt (see British patent application GB 2252568). According to another proposal, the silver coating is protected by treatment with a solution containing at least one of Cr (II), V (II or III), Ti (II or III), Fe (II), In (I or II), Cu (I) and Al (III) (see British patent application GB 2254339).

Furthermore, it is known to apply a tin precipitate on top of the silver layer, which optionally can be further treated with a silane solution, see, e.g., U.S. Pat. Nos. 6,017,580; 6,218,019; and 6,432,200 (Soltys). Alternatively the silver layer can be protected by a treatment with a tin salt and a silane.

Unfortunately, current methods of treating surfaces of reflective metal coatings to inhibit corrosion thereof are quite costly and in some cases involve the application of a two component system. Furthermore, current methods make use of heavy metals like tin which due to environmental concerns should be restricted as much as possible.

Bearing in mind the problems and deficiencies of the prior art, in one embodiment it is an object of the present invention to provide a method for enhancing the corrosion resistance of a reflective metal coating deposited on a substrate wherein the above mentioned prior art processes are replaced with a less expensive and an environmentally friendly one component system which not only protects the deposited metal layer against corrosion but also enhances the adhesion of an optional final outside coating e.g. a paint commonly used in the art. The inventive process e.g. may be used in existing commercial mirror making conveyor systems without having to add extra sections to the system.

In another embodiment it is an object of the invention to provide an improved corrosion inhibiting metal coated substrate e.g. a mirror and other metal substrates and metal articles of manufacture.

Still other objects and advantages of the invention will be apparent from the specification.

SUMMARY OF THE INVENTION

In a first aspect the present invention refers to a method for enhancing metal corrosion resistance of a metal, preferably a reflective metal, deposited on a substrate, the method comprises contacting the metal coated substrate with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

In a second aspect the present invention refers to a method for enhancing metal corrosion resistance of a metal, preferably a reflective metal, deposited on a substrate, the method comprises contacting the metal coated substrate with a treating composition comprising a film forming organic component selected from the group consisting of an aromatic triazole compound, a silicone resin and mixtures thereof.

In a third aspect the present invention refers to a method for making a mirror comprising a substrate having a metal, preferably a reflective metal, coated thereon, the method comprises contacting the metal coated substrate with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

In a fourth aspect the present invention refers to a method for making a mirror comprising a substrate having a metal, preferably a reflective metal, coated thereon, the method comprises contacting the metal coated substrate with a treating composition comprising a film forming organic component selected from the group consisting of an aromatic triazole compound, a silicone resin and mixtures thereof.

In a preferred embodiment said methods for making a mirror having enhanced metal, preferably reflective metal, corrosion resistance comprise the further process steps of (i) supplying a substrate, (ii) cleaning the substrate, (iii) optionally sensitizing the substrate, (iv) optionally activating (supersensitizing) the substrate, (v) applying a layer of a metal, preferably reflective metal, onto the substrate.

In a fifth aspect the present invention refers to a substrate having a metal (e.g., a reflective metal) deposited thereon which metal layer has been contacted with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

In a sixth aspect the present invention refers to a substrate having a metal (e.g., a reflective metal) deposited thereon which metal layer has been contacted with a treating composition comprising a film forming organic component, selected from the group consisting of an aromatic triazole compound, a silicone resin and mixtures thereof.

In a seventh aspect the invention provides a mirror having a metal (e.g., a reflective metal) deposited on a substrate which metal layer has been contacted with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

In an eighth aspect the invention provides a mirror having a metal (e.g., a reflective metal) deposited on a substrate which metal layer has been contacted with a treating composition comprising a film forming organic component, selected from the group consisting of an aromatic triazole compound, a silicone resin and mixtures thereof.

BRIEF DESCRIPTION OF FIGURES

The present invention will be readily understood by reference to the following figures:

FIGS. 2 and 3 show a silver coated substrate onto which a treating composition according to the present invention has been sprayed.

DETAILED DESCRIPTION OF THE PREFERRED EMBODIMENTS

Figure 1:
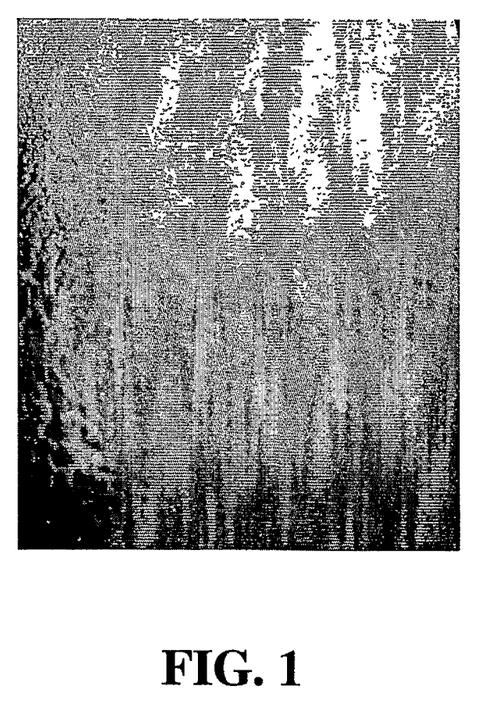
FIG. 1 shows a silver coated substrate onto which deionised water was sprayed. The liquid forms a continuous layer.
Figure 2:
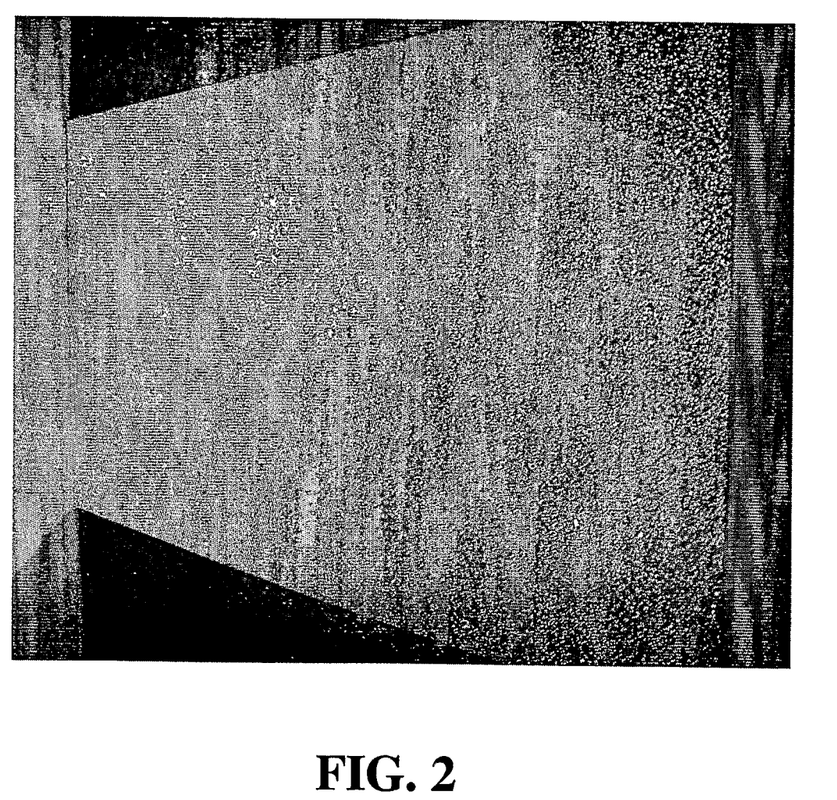
In FIG. 2 the treating composition of example 3 and in FIG. 3 the treating composition of example 6 has been used. As can be seen, by means of the treating composition a hydrophobic film has been formed on the metal coated substrate and the liquid film has been broken up into droplets. This is an indication for an increase of the surface tension of the metal coated substrate.
Figure 3:
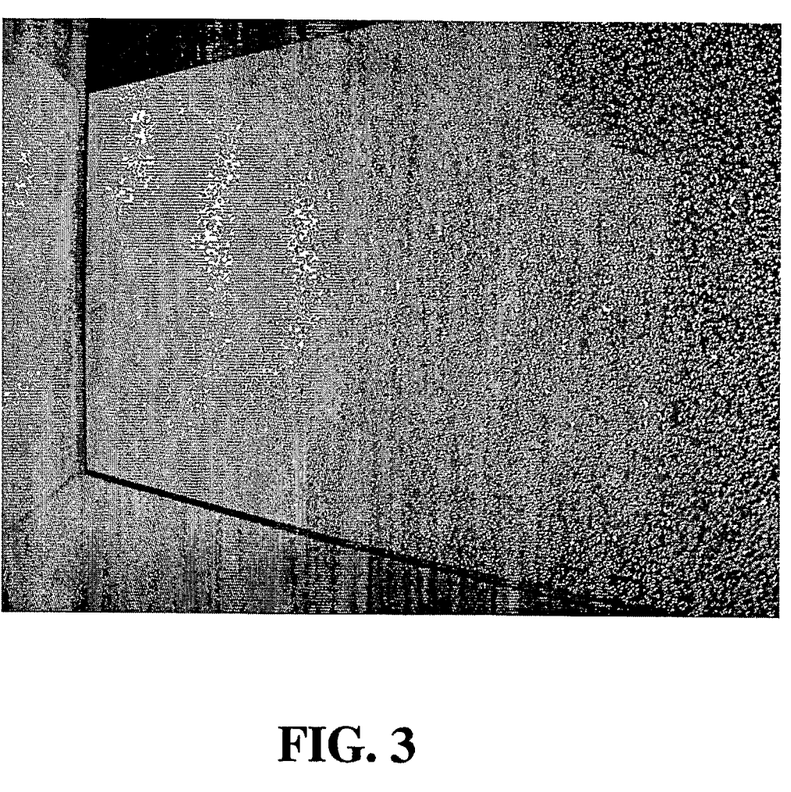
Figure 4:
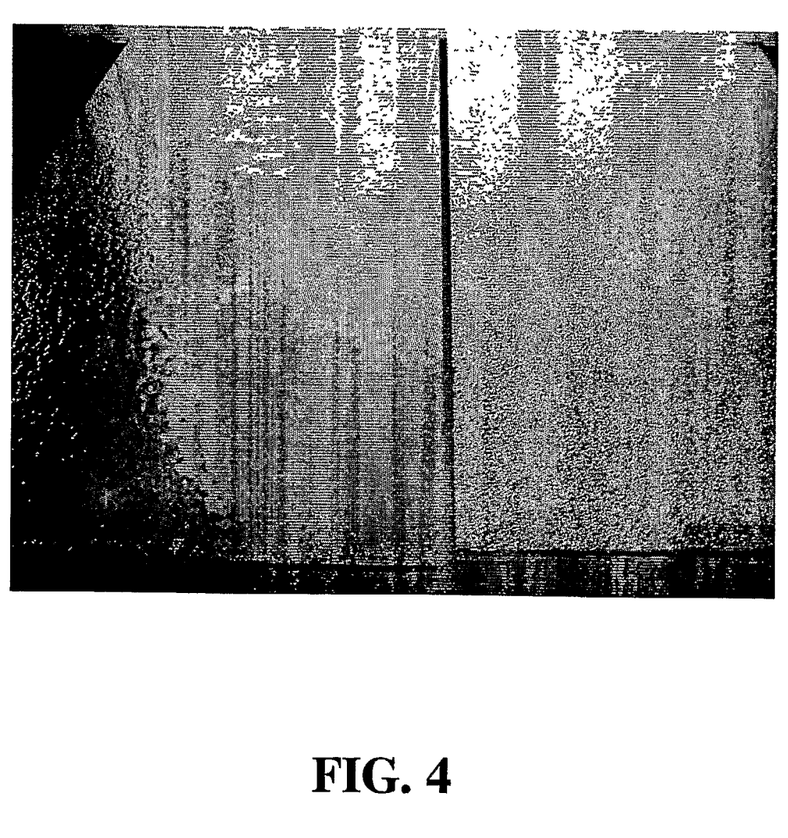
FIG. 4 shows on the left side a silver coated substrate onto which deionised water was sprayed. On the right side the treating composition of example 3 has been applied onto the silver coated substrate. Again on the treated side the continuous liquid film has been broken up into droplets, which again is an indication for an increase of the surface tension of the metal coated substrate.

In one embodiment of the present invention, a method for enhancing metal corrosion resistance of a metal (e.g., a reflective metal) deposited on a substrate is provided, the method comprises contacting the metal coated substrate with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

In a preferred embodiment the treating composition according to the present invention comprises the film forming organic component and an aqueous carrier.

Suitable aqueous carriers as used according to the present invention include liquids which comprise water in more than 50% by weight, preferably more than 80% by weight. As a further component a cosolvent (e.g., a lower alcohol having 1 to 4 carbon atoms or a lower ketone having 3 or 4 carbon atoms) can be used in an amount of less than 50% by weight, preferably less than 20% by weight. In a preferred embodiment the aqueous carrier is water.

After application of the treating composition of the present invention onto the metal coated substrate a hydrophobic film with a thickness of less than 1 g/m is formed. In a preferred embodiment contacting the metal coated substrate with said treating composition comprising a film forming organic component as described above causes an increase of the surface tension of the metal coated substrate. The increase of surface tension is readily visible on the treated surface: After application of the treating composition a continuous liquid film of the treating composition is formed on the metal coated substrate which breaks up into droplets in less than 10 s, mostly in 1-2 s (at room temperature). The formation of droplets is a clear indication that according to the present invention a hydrophobic film was formed on the metal coated substrate providing an increased surface tension to the surface of the metal coated substrate.

In a preferred embodiment the film forming organic component is selected from the group consisting of an aromatic triazole compound, a silicone resin and mixtures thereof. While not intending to be bound by theory, the film forming organic component is theorized to work because it forms a film that can adhere to the metal coating and provides a hydrophobic effect that repels compounds that would otherwise attack and corrode the metal coating. The aromatic triazole compound according to the present invention can be described by any one of the following general formulae:

wherein R includes hydrogen; halogen; a linear, branched or cyclic alkyl group of the formula $C_nH_{(2n+1)}$, a linear, branched or cyclic alkanoyl group of the formula $C_nH_{2n}OH$; a linear, branched or cyclic carboxyl group of the formula $C_nH_{2n}COOH$; or a linear, branched or cyclic imino group of the formula $C_nH_{2n}NH$; or $SO_2R$ with R as defined above; wherein n includes from 1 to 12, preferably 1 to 8, more preferably 1 to 6;

R' includes hydrogen; a linear, branched or cyclic alkyl group of the formula $C_nH_{(2n+1)}$, a linear, branched or cyclic alkanoyl group of the formula $C_nH_{2n}OH$; a linear, branched or cyclic carboxyl group of the formula $C_nH_{2n}COOH$; or a linear, branched or cyclic imino group of the formula $C_nH_{2n}NH$; wherein n includes from 1 to 12, preferably 1 to 8, more preferably 1 to 6;

$M^+$ includes alkaline or alkaline earth ions, like $Li^+$, $Na^+$, $K^+$ or $Rb^+$, with alkaline ions being preferred and $Na^+$ being especially preferred; and $X^-$ includes monovalent anions, like $F^-$, $Cl^-$, $Br^-$ or $I^-$.

Mixtures of aromatic triazole compounds can be used according to the present invention.

The number of groups R on the benzol ring can be 1, 2, 3 or 4 with 1 being especially preferred.

Halogen as used above includes Cl, Br, F and I, with Br and Cl being preferred and Cl being more preferred.

The linear, branched or cyclic groups having 1-12, preferably 1 to 8, more preferably 1 to 6 carbon atoms as used in the meaning of the group R and/or R' preferably is a linear group and more preferably is a linear alkyl group. Especially preferred groups R and/or R' are $CH_3$, $C_2H_5$ and $C_3H_7$, with $CH_3$ being more preferred.

The aromatic triazole compound of the above formula can be produced according to methods known in the art.

Aromatic triazole compounds thereof which can be used according to the present invention are commercially available. For example a mixture of benzotriazole and tolyltriazole is commercially available under the tradename Cobratec® 939 from Raschig GmbH. Especially useful aromatic triazole compounds are butyl benzotriazol, sodium salt commercially available under the tradename Inhibitor™ AZ 8104 from GE Betz GmbH, and sodium-4 (or -5)-methyl-1H-benzotriazolide (CAS:64665-57-2) commercially available under the tradename Inhibitor™ AZ 8101 from GE Betz GmbH.

In case the aromatic triazole compound used is not readily soluble in the aqueous solvent, e.g. when R is hydrogen, the pH of the treating solution can be increased in order to increase the solubility. While not intending to be bound by theory and although the mechanism involved is not fully understood it is theorized that when contacting the aromatic triazole compound with the metal deposited on a substrate, chemisorption occurs on the surface of the metal. The aromatic triazole forms a complex with the metal, preferably reflective metal, deposited on the substrate. Usually a covalent bond is formed between the metal and the aromatic triazole ring. The optionally substituted benzol ring orients itself away from the metal and forms a hydrophobic surface. The hydrophobicity, it is believed, helps protect the metal by repelling aqueous soluble agents that might otherwise attack (e.g., corrode) the metal.

The silicone resin which can be used according to the present invention is an oxygen containing compound of silicon having alkoxy and/or amino groups Preferably, the silicone resin comprises the structural element wherein Y includes a group selected from $OR^2$ and $NR_2^2$, $R^1$ includes an alkyl group with 3 to 12 carbon atoms, $R^2$ includes methyl or ethyl; and
a includes 0.8 to 1.2,
b includes 0.2 to 1.2
and n includes <10000.

$R^1$ includes an alkyl group with 3 to 12 carbon atoms. This alkyl group can be linear or branched. Examples of these alkyl groups include hexyl, octyl, nonyl, isononyl, decyl and dodecyl groups. Preferred are linear alkyl groups with 3 to 8 carbon atoms, especially those with 6 to 8 carbon atoms.

Preferably $R^2$ includes an ethyl group.

Preferably a is 1.0.

Preferably n includes >10, more preferably >100, especially >1000.

It is preferred that the value a+b is within a range of 1.2 to 2.4.

Some of these silicone compounds are commercially available agents for rendering a surface hydrophobic. For example an emulsion of a silicone resin commercially available under the trade name Tegosivin HE899 or a product known under the trade name Tego Phobe 1000 or Tego Phobe 1300 supplied by Tego Chemie Service GmbH, advantageously can be used.

In addition to the film forming organic component and the aqueous carrier the treating composition according to the present invention can optionally comprise an additive such as a surfactant, emulsifier, dispersant and the like. Said additive preferably will be present in the treating composition in an amount of 0 to 0.5% by weight, more preferably in an amount of 0.01 to 0.1% by weight with respect to the treating composition.

In a preferred embodiment the film forming organic component is applied to the surface of the metal, preferably reflective metal, deposited on a substrate in an amount about 0.1 to about 200 $mg/m^2$, preferably in an amount about 0.5 to about 100 $mg/m^2$ and more preferred in an amount of about 1 to about 10 $mg/m^2$. Usually the film forming organic compound is applied to the surface of the metal deposited on a substrate in a liquid volume of 50 to 1000 $ml/m^2$, preferably in a liquid volume of 100 to 300 $ml/m^2$.

Application of the treating composition can be performed using any known method of applying aqueous compositions to a substrate. Suitable methods for contacting a substrate with a treating composition, but are not limited to, dripping, spraying, rolling, brushing, dipping, pouring, immersion, curtain coating, and electrocoating. Of these, spray application is preferred, and may be carried out using small sprayers or large sprayers on a traverse mechanism. Usually, application of the treating composition will result, after drying, in a layer of the film forming organic component deposited on the metal, preferably reflective metal, coated substrate. Preferably this layer has a thickness of less than 1 μm, preferably less than 500 nm, in another embodiment a thickness of less than 100 nm.

Temperature is another factor that should be controlled for optimal performance when contacting the metal, preferably reflective metal, coated substrate with a treating composition of a film forming organic component. Suitably the temperature according to the present invention can be in a range between 1°-60° C. The preferred temperature range is between 21°-35° C., and more preferably between 26°-32° C.

The substrate according to the present invention include any substrates onto which a metal film or layer, preferably a reflective metal film or layer, can be applied. Exemplary substrates include, but are not limited to, substrates selected from vitreous products including ceramics or glass including soda lime glass and other conventional glass products used in mirror making manufacture; materials used in making Christmas ornaments; polymeric materials; and particles, e.g., metal particles. Suitable polymeric materials include thermoplastics, and thermosets such as polycarbonate, LEXAN, plexi-glass, lacquered materials (e.g. materials covered with an acryl lacquer), polyethylene, polymethacrylate, and other polymeric materials. Suitable particles according to the present invention comprise particles of the aforementioned materials as well as silver flakes and powders, metal (silver) coated mica, metal (silver) coated metal particles, e.g., Ni or Cu particles, and the like. All these substrates may be treated using the method of the invention to increase the corrosion resistance.

The substrate can be in a variety of shapes and need not be planar. It is important to select input materials carefully, and substrates of good quality should be used in order to get a superior final product. In a preferred embodiment the substrate is a sheet of glass used for mirror production.

According to the present invention the metal deposited on a substrate can be selected from silver, gold, copper, nickel, lead, ruthenium and chrome. Silver is preferred.

The inventive method for enhancing metal corrosion resistance of a metal, preferably reflective metal, deposited on a substrate advantageously can be used in a method for making a mirror. This method for making a mirror comprises contacting the metal coated substrate with a treating composition comprising a film forming organic component, which treating composition forms a hydrophobic film on the metal coated substrate with a thickness of less than 1 μm. In a preferred embodiment contacting the metal coated substrate with said treating composition comprising a film forming organic component as described above causes an increase of the surface tension of the metal coated substrate.

Alternatively, the present invention refers to a method for enhancing metal corrosion resistance of a metal deposited on a substrate, the method comprises contacting the metal coated substrate with a treating composition comprising a film forming organic component selected from the group consisting of an aromatic triazole compound, a silicone resin and mixtures thereof. Moreover, the present invention refers to a method for making a mirror comprising a substrate having a metal, preferably a reflective metal, coated thereon, the method comprises contacting the metal coated substrate with a treating composition comprising a film forming organic component selected from the group consisting of an aromatic triazole compound, a silicone resin and mixtures thereof.

In a preferred embodiment the methods for making a mirror having enhanced metal, preferably reflective metal, corrosion resistance comprise the further process steps of (i) supplying a substrate, (ii) cleaning the substrate, (iii) optionally sensitizing the substrate, (iv) optionally activating the substrate, and (v) applying a layer of metal, preferably reflective metal, onto the substrate.

Preferably, before using a substrate in the method of the present invention, the substrate is cleaned. While not intending to be bound by theory, it is believed that this can be an important step, as contaminants can have a very negative effect on the finished product. Typically, the cleaning is done as known in the art e.g. by washing with water, optionally containing a surfactant solution as known in the art (e.g. a 0.1% surfactant solution, e.g. Deterlon K3/Valspar) and optionally scrubbing using a cerium oxide based slurry or a cerium oxide based slurry optionally comprising one or more compounds selected from chalk, iron oxide and the like. Other compounds may be used in conjunction with the cerium oxide, or may replace the cerium oxide entirely.

After the substrate surface has been cleaned and preferably rinsed, it is then optionally sensitized using, for example, conventional sensitizing solutions. In general a conventional stannous ion solution, including $SnCl_2$, $SnF_2$, SnI$_2$, SnBr$_2$, but most typically a SnCl$_2$ solution is applied to the substrate. The sensitizing solution can be applied to the glass surface by pouring, immersion, dipping, spraying or rinsing the solution over the glass surface. An acidic stannous solution is generally used to sensitize the glass surface, although the stannous solution alone can be used if it is prepared shortly before use. A stannous ion concentration 10-1000 mg/l and a pH of 2-5 is typically employed but these sensitizing solutions may vary widely in composition and concentration. This sensitizing solution is typically in contact with the substrate just long enough to adsorb a thin layer of molecules onto the substrate surface. The time varies depending on the concentration used, but is often less than 30 seconds, and preferably less than 20 seconds. Following the addition of the optional sensitizer, the substrate preferably is rinsed with deionised water.

Generally, said sensitizing step can be carried out prior, after or simultaneously to an optional activating (supersensitizing) step. However, it has been observed that the order of the steps seems to be important to obtain good durability. Therefore, carrying out said sensitizing step prior to an optional activating step is preferred. An acidic solution comprised of at least one ion selected from the group consisting of bismuth (III), chromium (II), gold (III), indium (III), nickel (II), palladium (II), platinum (II), rhodium (III), titanium (III), vanadium (III) and zinc (II) has been described in the prior art. However, the present invention is not restricted to this specific activation method. The activation can also be effected according to the teaching of the co-pending patent application (filed on the even date hereof and having Atty. Ref. No. 06 1733 0100), which application is hereby incorporated by reference.

Application of the activation solution can be performed using any known method of applying liquids to a substrate. Suitable methods for contacting a substrate with a solution of the activation composition, but are not limited to, dripping, spraying, rolling, brushing, dipping, pouring, immersion, curtain coating, and electrocoating. Of these, spray application is preferred, and may be carried out using small sprayers or large sprayers on a traverse mechanism.

After optionally cleaning the substrate, optionally sensitizing the substrate, and optionally activating the substrate as described above a layer of metal is coated onto the substrate according to methods and techniques known in the art. For example the metal may be deposited to the substrate by a variety of methods including metallizing, electrical deposition, and electroless deposition. In the mirror production process, the method of electroless deposition is generally used both for speed and cost reasons. This electroless deposition process includes several steps in order to change the starting substrate into the finished product. In production plants, these steps are generally conducted on the substrate as it moves on a conveyor through the different stages. For superior production, de-ionized water should be used in all steps, preferably having at least a 1 million-ohm resistance.

In a preferred embodiment silver is used as a metal. Such a silver coating can be applied to the optionally sensitized, optionally activated glass surface following conventional coating techniques such as described in U.S. Pat. No. 4,737,188. Basically, a silver solution and a reducing solution are brought together before or at contact with the substrate to be silvered by pouring or metering the solutions such that they meet just before contact with the substrate. Alternatively, the component solutions may be sprayed using an air or airless system prior to or simultaneously with intermixing at the surface of the substrate.

These component solutions may be mixed together before use, may be mixed just prior to spraying, or sprayed independently onto the glass. Preferably they are each mixed into the same water stream just prior to the point of spraying. The ionic silver solution can be any solution in which the silver is present in the ionic state and is sufficiently soluble in water for easy application and reaction with the reducing solution. Therefore, the ionic silver solution can be formed from silver salts, silver complexes, or coordination compounds. Ammonia is the preferred complexing agent, and is used to form an ammoniated silver nitrate solution. The reducing solution can be formed from invert sugars, N-methylglucamine, D-glucamine, glucono-delta-lactone, glucosaminic acid, or other compounds known in the art as reducing agents. Usually the reducing solution will also be mixed with a sodium hydroxide or ammonium hydroxide in order to create the proper alkaline pH for the reaction to proceed. The silvering solution is typically in contact with the substrate long enough to create the proper metal film thickness. The time varies depending on the concentration used and the reaction conditions, but is often less than two minutes and is preferably one minute or less. Depending on anticipated use and quality desired, the silver thickness is generally more than 500 milligrams of silver per square meter of substrate. More preferably it will be more than 600 milligrams per square meter, and most preferably will be more than 800 milligrams per square meter. Usually the silver thickness is generally less than 1400 milligrams of silver per square meter of substrate, preferably less than 1000 milligrams per square meter, and more preferably less than 900 milligrams per square meter. Following the silvering solutions the substrate is again rinsed with deionised water.

The layer of silver may be deposited in the form of a silver coating which is fairly thin so that it is transparent. Flat glass substrates carrying such transparent coatings are used to form glazing panels which reduce the emission of infrared radiation and/or which protect from solar radiation. Thus according to one embodiment of the invention the thickness of the layer of silver formed in said silvering step is between 8 nm and 70 nm, preferably between 8 nm and 30 nm. According to another embodiments of the invention, where the product is a mirror, for example a domestic mirror or a vehicle rear-view mirror the thickness of the layer of silver formed in said silvering step is between 70 nm and 100 nm.

It is conventional to protect the silver coating with an overcoating of copper to retard tarnishing of the silver layer. The copper layer is itself protected from abrasion and corrosion by a layer of paint. Historically, those paint formulations which afford the best protection against corrosion of the copper layer contain lead pigments. The use of lead pigments is being discouraged. Furthermore, the addition of a copper layer adds time and expense to the mirror making, and adds weight to the final product. Therefore, creating a final product that has high performance without a copper layer is desirable.

According to the present invention, a conventional protective layer of copper is not necessary and therefore, paint formulations containing lead pigment are no longer necessary since the mirror according to the present invention is produced following the concept of the so called "copper-free mirrors" with the improvement that according to the present invention the surface of the reflective metal deposited onto the substrate is treated with a treating composition comprising a film forming compound in order to further increase corrosion resistance After application of the film forming compound the substrate is pre-heated. Prior to this stage, the substrate should be rinsed and air blowers used to remove all free water from the surface. In this stage, the substrate will be heated to dry water vapor from the substrate and warm up the substrate for the final coating. The temperature used suitably is in the range of 30°-80° C., preferably in the range of 54°-71° C. The preferred pre-heating time is usually in the range of 30 s to 2 min and more preferably approximately 1 minute. As the water and water vapor is driven off, this stage increases adhesion of the metallic layer to the glass surface and also enables the final coating to have superior performance.

The silver coating having the organic film forming compound applied thereon, may now be covered with one or more protective paint layers and according to a preferred aspect of this invention such a paint can be free, or substantially free, of lead and can be based on alkyd, acrylic, epoxy and polyurethane based resins known in the art (e.g. Valspar SK1390 and SK1395). Also leaded paints, although not necessary, are useable (e.g., Valspar SK9675 base coat with a lead-free top coat). Optionally, this protective paint may consist of a base coat and at least one top coat, or the protective paint may consist of a single final coating based on alkyd, acrylic, epoxy and polyurethane based resins e.g. Valspar SK1420. Also leaded paints, although not necessary, are useable like Valspar SK1750 single coat. These coatings may be sprayed on, brushed on, rolled on, applied via a curtain coating, applied by using an electrostatic process, or by using other techniques. Preferably, curtain coating will be used for a liquid coating, and electrostatic application for a powder coating.

Generally, the final coating is highly resistant to the environment and also helps to physically protect the layers. The preferred final coating will therefore be both light and strong. The final coating may be a leaded paint, a paint without lead, or a powder coating, for example, on the basis of an epoxy resin e.g. Valspar X98-47-1. After application, the coating may optionally be cured, e.g., using heat, UV-, IR-, NIR-, or e-beam radiation.

Preferably, the protective paint layer applied according to the present invention has a thickness of 10-100 μm, preferably of 20-50 μm in case of a one layer protective paint and has a thickness of 10-100 μm, preferably of 30-70 μm in case of a two layer protective paint. In addition, in some instances a further UV-stable outer coating can be applied on top of the protective paint layer in a thickness of 2-10 μm. These UV-stable outer coatings usually are epoxy based products known in the art.

The next step may include optional final washing and final drying. This is to clean any overspray of silver or final outside coating and any other particles that may be on the final substrate. This cleaning may involve the use of ferric salts rubbed against the substrate with rubber rollers. After the washing, there is usually an optional final drying step. This dries the mirror and removes free water and water vapor from the final product. The final washing and drying steps help ensure that the substrate is clean. In addition to removing overspray, the final steps help decrease tackiness of the final coating and help remove any possible contaminants from the surfaces that may damage the substrates when they are stacked or stored together.

The inventive method for enhancing metal corrosion resistance of a metal, preferably reflective metal, deposited on a substrate has been found to provide improved product longevity and weatherability. This is greatly advantageous especially for copper-free mirrors. Furthermore, in view of the existing methods of improving the corrosion resistance the method of the present invention does not make use of heavy metals like tin which due to environmental concerns should be restricted as much as possible. Moreover, the handling of the inventive treating composition is easier than of those of the prior art, since according to the present invention a one component system can be used in contrast to two component systems of the prior art. The inventive method is less expensive than the prior art methods and does not only protect the deposited metal layer against corrosion but also enhances the adhesion of an optional final outside coating e.g. a paint commonly used in the art.

Test Methods

Copper-Accelerated Acetic Acid Salt Spray Test (CASS)

This test follows the ISO 9227 standard except that the samples in this test were placed like a rhombus. The upwards side will be judged. The edge corrosion will be measured with a WILD-Microscope with calibrated Reticule measuring device. The surface corrosion is appraised by visual inspection with a halogen light.

Humidity Test

The Humidity Test follows the DIN 50 017 standard except the used temperature is 50° C.

EXAMPLES

Preparation of a Sample According to a Standard Process

Example 1

Formulation of the solutions (all solutions are diluted to the given concentrations with deionised):
Solution 1: 0.1% surfactant solution (Deterlon K3/Valspar)
Solution 2: 5% cerium oxide (CERI 2645-Pieplow&Brandt)
Solution 3: 0.04% RNA solution (Valspar/stannous chloride solution)
Solution 4: 0.02% RNG 7252 solution (Valspar/palladium dichloride)
Solution 5: 5% GMP-MS silver solution (Valspar)
Solution 6: 5% GMP-MA reduction solution (Valspar)
Solution 7: 0.5% GMP-A metallizing solution (Valspar)
Solution 8: 0.5% GMP-B silanization solution (Valspar)

Preliminary Cleaning of a Glass Plate Followed by Polishing

A flat glass sheet (0.75 m×0.45 m) is preliminarily cleaned with 200 ml of solution 1 by means of a sponge. Subsequently, the glass is rinsed with deionised water. The glass is polished with 200 ml of solution 2 by means of a felt-coated vibrating grinder for 90 seconds and rinsed with deionised water.

Sensitization of the Glass

The glass is sensitized by pouring 170 ml of solution 3 onto it for 20 seconds. Subsequently it is rinsed with deionised water.

Activation of the Glass

The glass is activated by pouring 250 ml of solution 4 onto it. The solution remains on the surface for 45 seconds. Subsequently, the surface is rinsed with deionised water.

Silver-Plating of the Glass

The glass plate is silvered by first spraying it with solution 5 and subsequently spraying it with a combination of solutions 5 and 6 (1:1 ratio) in an amount of 380-400 ml/m². The solutions are sprayed on by means of a pressurized vessel so that they mix on the glass surface. Silvering takes place at a glass temperature of 28 to 30° C. The solutions remain on the glass for 45 seconds. Subsequently, the glass is rinsed with deionised water.

Passivation of the Silver Layer

Solutions 7 and 8 (1:1 ratio) in an amount of 180-240 ml/m² are sprayed onto the silver from a pressurized vessel so that they mix on the glass surface. 180 to 240 ml/m² are applied. Subsequently, the surface is rinsed with deionised water.

Lacquer Coating

The glass sample is pre-dried with air prior to coating it with two protective lacquer layers and afterwards dried for 24 h at room temperature. The lacquers, a base lacquer Valspar SK 1390 and a finishing lacquer Valspar SK 1395, are applied by means of a Burkle casting machine at a dry thicknesses between 22 and 28 μm, each. A total thickness of the layer of 50 μm is aimed at. The glass sample coated with the lacquers are baked at temperatures of 140 to 150° C. for 3 to 3.5 minutes in a continuous IR-furnace.

Preparation of the Samples According to the Present Invention

Examples 2-6

The preparation of samples according to the above standard process is followed except for the passivation step. According to the present invention solutions 7+8 are replaced by the treating composition comprising a film forming organic component as described above at various concentrations.

Result of the Test Samples

|  |  | Thickness lacquer layer (dry)[1] | CASS Test average of 3 samples | Humidity Test |
|---|---|---|---|---|
| Example 1 | Standard | 25 μm BL 25 μm TL | 180 μm | No change |
| Example 2 | Cobratec 939 252 mg/m² | 20 μm BL 32 μm TL | 150 μm | No change |
| Example 3 | Inhibitor ™ AZ8101 187 mg/m² | 20 μm BL 28 μm TL | 90 μm | No change |
| Example 4 | Inhibitor ™ AZ8101 933 mg/m² | 20 μm BL 28 μm TL | 90 μm | No change |
| Example 5 | Inhibitor ™ AZ8101 1866 mg/m² | 20 μm BL 28 μm TL | 90 μm | No change |
| Example 6 | Tego Sivin HE899 187 mg/m² | 36 μm BL 28 μm TL | 180 μm | No change |

[1]BL means base layer and TL means top layer and both refers to a two layer protective paint.

The evaluation of the examples according to the present invention in comparison with a standard shows that the treating composition comprising a film forming organic component provides a passivation at least as good as the one obtained with the standard. Mostly, the passivation provided according to the treating composition of the present application is considerably better. It should be noted that this effect can be achieved without the use of heavy metals like tin avoiding any environmental problems involved with the use of these metals.

A further advantage provided by the present invention is that hydrophobic protective paints can be applied more easily and general distribute more uniformly on a surface which has been treated with a treating composition comprising a film forming organic component according to the present invention. Furthermore, the inventive treating composition is only a one component system allowing a faster drying with a blower after application.

A number of embodiments of the invention have been described. Nevertheless, it will be understood that various modifications may be made without departing from the spirit and scope of the invention. Accordingly, other embodiments are within the scope of the following claims.

The invention claimed is:

1. A method for making a copper-free mirror, consisting essentially of:
contacting a reflective silver metal coated substrate at a temperature of 26° C. to 32° C. with a treating composition at a liquid volume of about 100 to 300 ml/m², wherein the treating composition is a one component system comprising a film-forming organic component comprising a silicone resin; and
at least one aromatic triazole compound of the following general formulae:

wherein
R includes halogen; a branched or cyclic alkyl group of the formula $C_nH_{(2n+1)}$; a linear, branched or cyclic alkanoyl group of the formula $C_nH_{2n}OH$; a linear, branched or cyclic carboxyl group of the formula $C_nH_{2n}COOH$; or a linear, branched or cyclic imino group of the formula $C_nH_{2n}NH$; or $SO_2R$ with R as defined above; and wherein n is greater than 1 and less than or equal to 12;
R' includes hydrogen; a linear, branched or cyclic alkyl group of the formula $C_nH_{(2n+1)}$; a linear, branched or cyclic alkanoyl group of the formula $C_nH_{2n}COOH$; a linear, branched or cyclic carboxyl group of the formula $C_nH_{2n}COOH$; or a linear, branched or cyclic imino group of the formula $C_nH_{2n}NH$; wherein n includes from 1 to 12;
$M^+$ includes $Li^+$, $Na^+$, $K^+$ or $Rb^+$;
$X^-$ includes $F^-$, $Cl^-$, $Br^-$ or $I^-$; and
the number of groups R on the benzol ring can be 1, 2, 3 or 4; and
an aqueous carrier comprising a liquid having water in about 80% by weight and a C1 to C4 alcohol or a C3 to C4 ketone as a cosolvent in no more than about 20% by weight; and
forming a single layer of a continuous hydrophobic film on the substrate with a thickness of less than 1 μm.

2. The method according to claim 1, wherein the aromatic triazole compound comprises a mixture of at least two aromatic triazole compounds.

3. The method according to claim 1, wherein the group R' is selected from $CH_3$, $C_2H_5$ and $C_3H_7$.

4. The method according to claim 1, wherein the silicone resin has the structural element wherein
Y includes a group selected from $OR^2$ and $NR_2^2$,
$R^1$ includes an alkyl group with 3 to 12 carbon atoms,
$R^2$ includes methyl or ethyl; and
a includes 0.8 to 1.2,
b includes 0.2 to 1.2
and n includes <10000.

5. The method according to claim 1, wherein the film forming organic component is applied to the surface of the metal deposited on a substrate in an amount about 0.1 to about 200 mg/m².

6. The method according to claim 1, wherein the substrate is a vitreous product selected from the group consisting of ceramics, glass; polymeric materials, and metal particles.

7. The method according to claim 6, wherein the metal particles are selected from the group consisting of silver flakes and powders, metal coated mica and metal coated metal particles.

8. The method according to claim 1, wherein the substrate is glass.

* * * * *